United States Patent [19]

Boughton

[11] Patent Number: 4,652,201
[45] Date of Patent: Mar. 24, 1987

[54] LOAD-CARRYING VEHICLES

[75] Inventor: Thomas T. Boughton, Amersham, England

[73] Assignee: T. T. Boughton & Sons Ltd., Great Britain

[21] Appl. No.: 703,688

[22] Filed: Feb. 21, 1985

[51] Int. Cl.⁴ .............................................. B60P 1/64
[52] U.S. Cl. ................................. 414/491; 414/473; 414/546; 414/498; 414/680; 414/549
[58] Field of Search .............. 414/547, 546, 549, 498, 414/420, 421, 555, 680, 473, 478, 482, 491

[56] References Cited

U.S. PATENT DOCUMENTS

| | | | |
|---|---|---|---|
| 3,892,323 | 7/1975 | Corompt | 414/498 X |
| 3,988,035 | 10/1976 | Corompt | 414/498 X |
| 4,147,266 | 4/1979 | Corompt | 414/498 X |
| 4,290,726 | 9/1981 | Sutelaetal | 414/498 X |
| 4,453,878 | 6/1984 | Paukku | 414/421 X |

FOREIGN PATENT DOCUMENTS

| | | | |
|---|---|---|---|
| 2927430 | 1/1981 | Fed. Rep. of Germany | 414/546 |
| 2315409 | 1/1977 | France | 414/546 |

Primary Examiner—Frank E. Werner
Attorney, Agent, or Firm—Lucas & Just

[57] ABSTRACT

This invention relates to a vehicle which is capable of lifting a load from the ground into a transport position on the vehicle and vice-versa. The lifting apparatus includes a member or frame (4) pivotally mounted at 5 on the vehicle chassis and controlled by a hydraulic ram (11). An arm (14) is pivotally mounted on the member or frame (4) and is controlled by a hydraulic ram (16). A member (18) is telescopically mounted in the arm (14) and is controlled by a third hydraulic ram. Bars (20 and 21) on the end of the member (18) are engageable in slots (22 and 23) on the forward end of a flatrack or similar load (24). In one embodiment of the invention, the mechanism can be used for tipping a load as well as for hoisting it on and off the vehicle and, for this purpose, hooks (27), rollers (28) and the pivot point (5) are located in brackets (8) rotatable about an axis (7).

7 Claims, 10 Drawing Figures

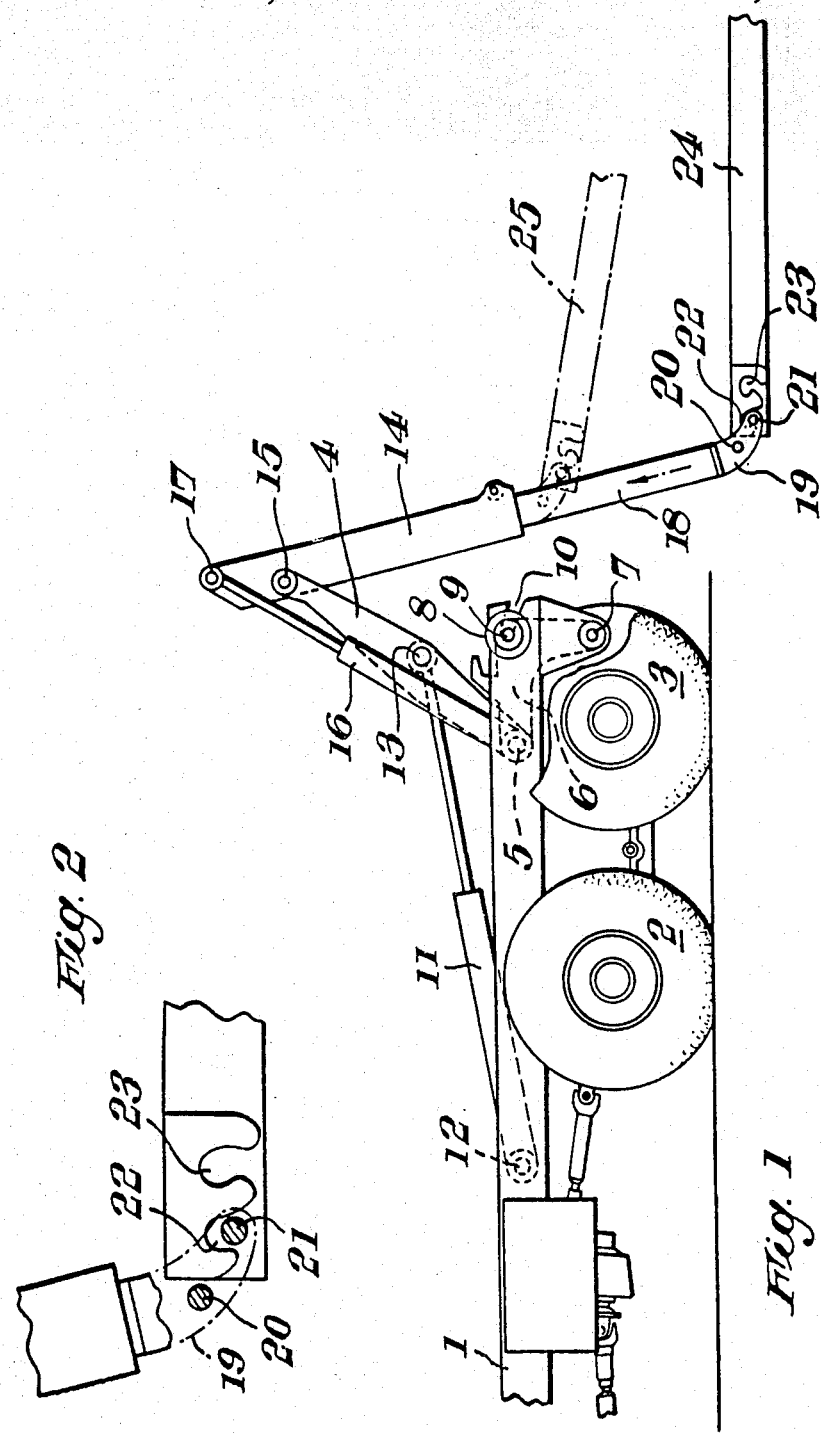

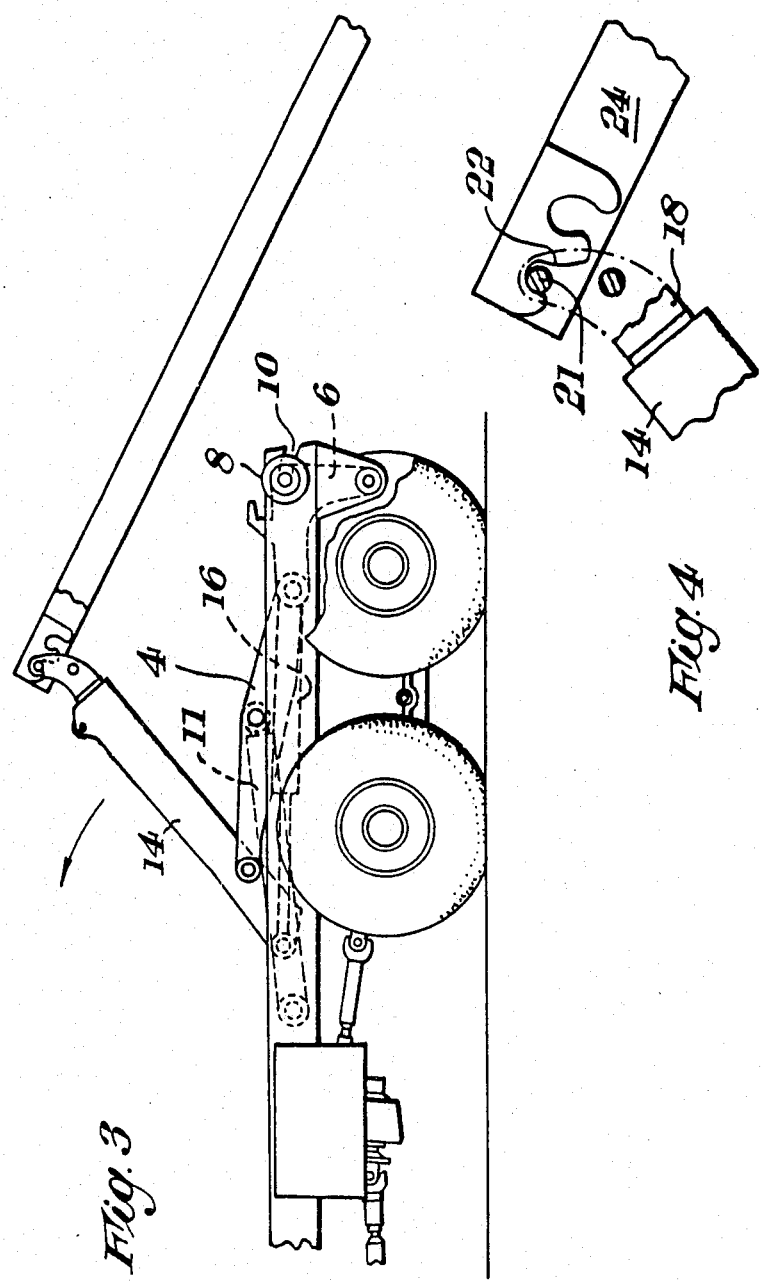

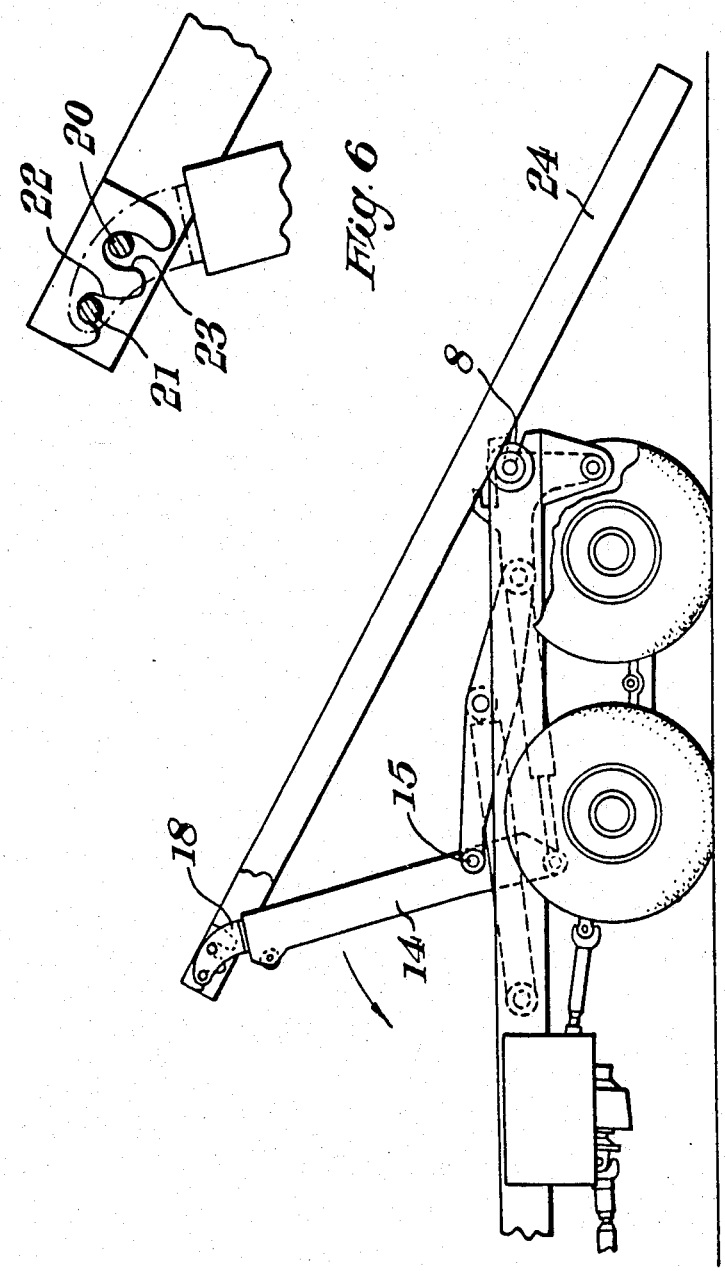

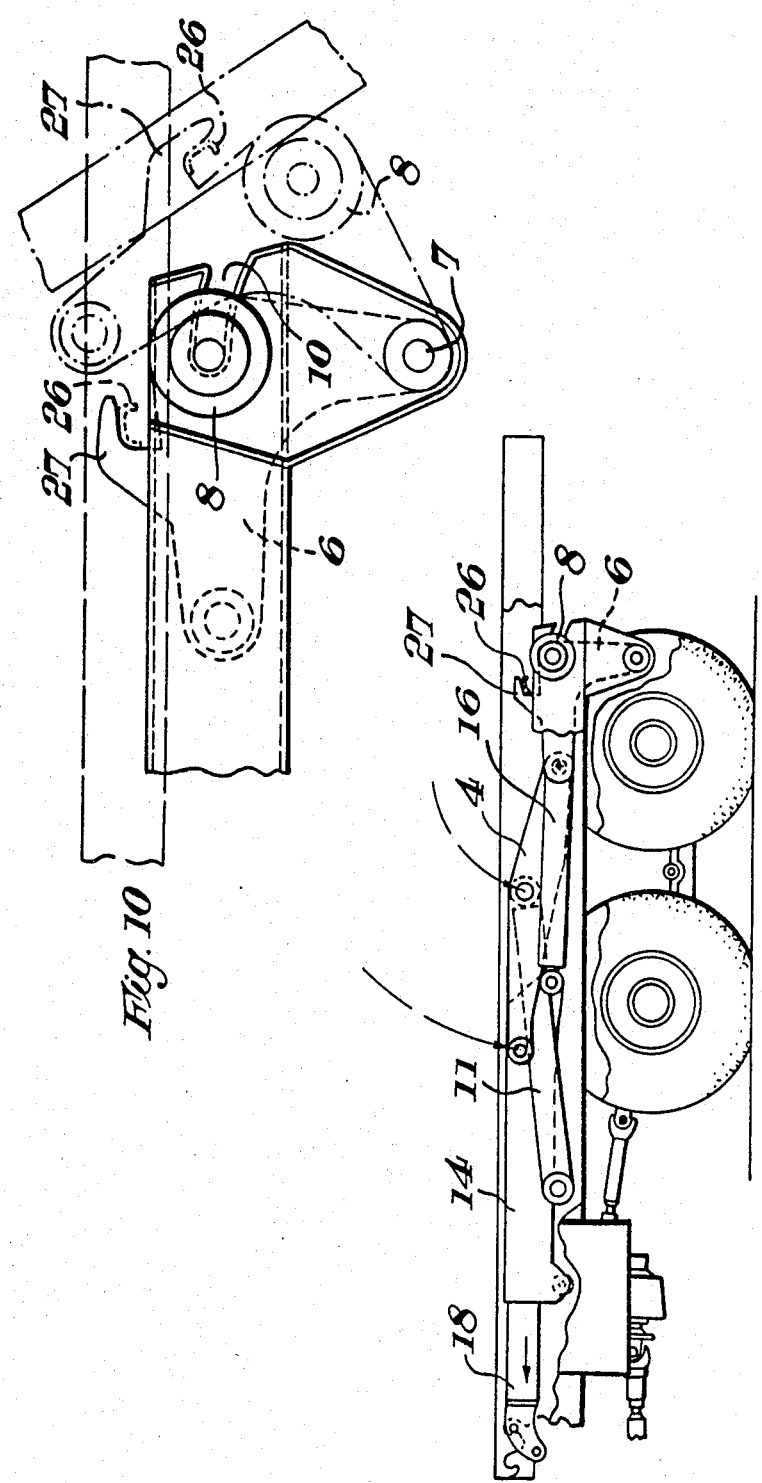

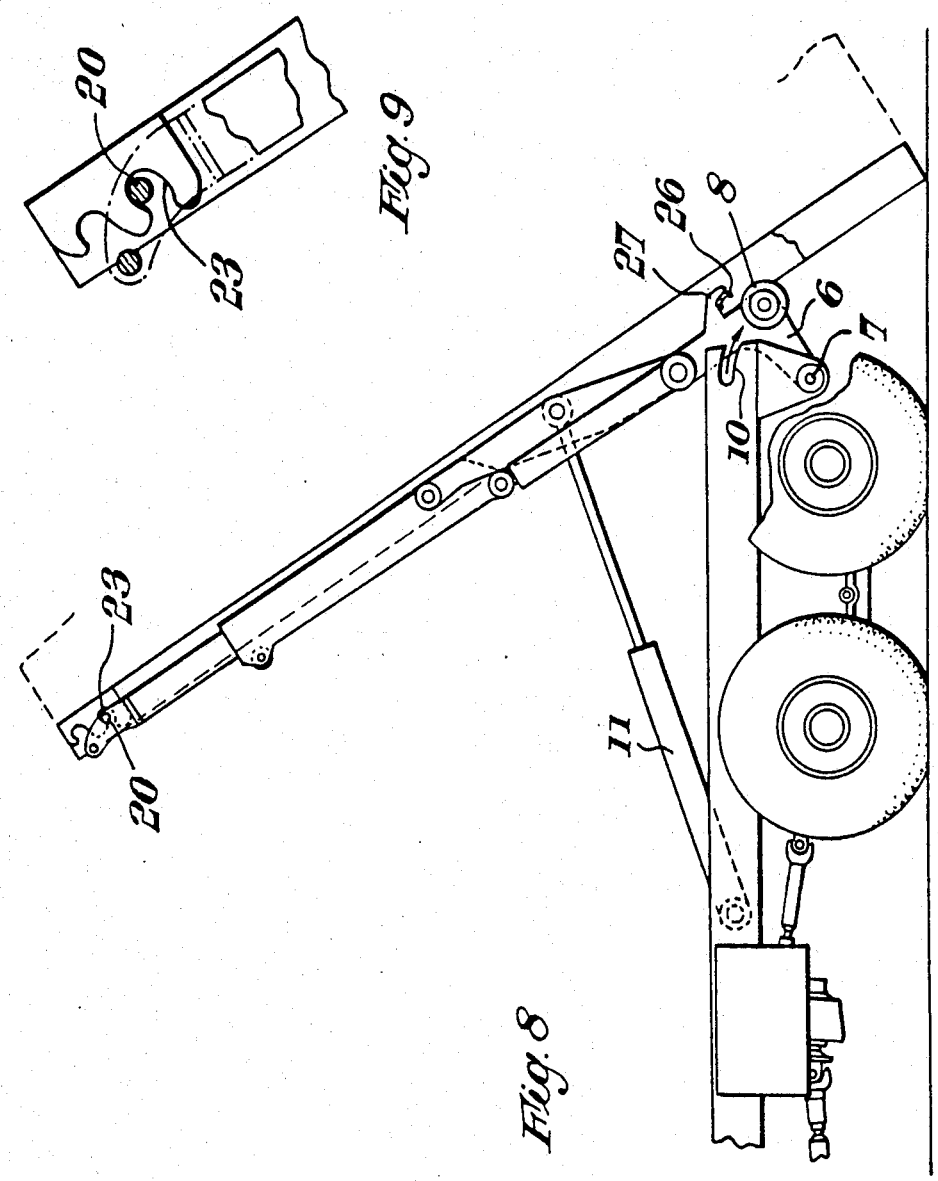

LOAD-CARRYING VEHICLES

This invention relates to load-carrying vehicles, and it is an object of the invention to provide a mechanism on a vehicle for lifting a load from the ground on to the vehicle and depositing the load from the vehicle on to the ground. In a particular embodiment of the invention the mechanism is also designed to raise the load on the vehicle to an inclined position so that the contents of the load may be tipped.

Many systems are known for lifting containers from the ground on to vehicles and likewise depositing the containers on to the ground. Most of these systems include a hoisting beam having a first part which is parallel to the ground when the container has been loaded on to the vehicle, and a second part upstanding vertically from the forward end of the first part. The upper end of the second part is provided with first attachment means which engage with second attachment means situated at the forward upper edge of the container. Means are provided for rotating the hoisting beam about a pivot axis located in the vicinity of the rear of the vehicle, and rollers are provided on the vehicle also at the rear thereof. Thus, by operation of these means, the hoisting beam can be moved to a position in which the first attachment means on the end of the second part can be engaged with the second attachment means on the container, and can then be moved about the pivot axis to lift the container on to the vehicle and slide it along the rollers into a position in which it is situated on the vehicle chassis. In some versions of this type of vehicle, the second part of the hoisting beam is telescopically slidable with respect ot the first part so that, when the container has been hoisted on to the vehicle, it can be moved further forwardly by extending the second part of the hoisting beam forwardly with respect to the first part.

In general, vehicles of the kind described above are unsuitable for lifting flatracks or other similar loads which do not have an upstanding forward part similar to that on a container. The reason for this is that the first attachment means on the hoisting beam are not designed to reach ground level and, even if a system were modified so that the first attachment means could reach ground level, the mechanism would not be capable of lifting the load from this position.

Accordingly it is an object of the present invention to provide a mechanism on a vehicle which is specifically designed to lift loads in which it is necessary to engage first attachment means on a hoisting beam with second attachment means located either at, or only a short distance above, ground level.

From one aspect the invention consists in a vehicle having a first longitudinally extending member pivotally mounted at or near one end thereof to pivot about a first pivot point in the vicinity of the rear end of the vehicle chassis; a second longitudinally extending member pivotally mounted in the vicinity of one end thereof to pivot about a second pivot point at or near the other end of said first member; a third longitudinally extending member slidable with respect to said second member; attachment means on the end of said third member remote from said one end of said second member; first hydraulic means for controlling the angular position of said first member about said first pivot point; second hydraulic means for controlling the angular position of said second member about said second pivot point; and third hydraulic means for producing relative linear motion between said second and third members.

It is to be understood that, when the vehicle is transporting a load, the first member will be substantially horizontal with its other end forward of its one end, and the second member will also be substantially horizontal with the third member projecting forwardly from the second member. Thus the attachment means will be at the forward end of the vehicle chassis and will engage in cooperating further attachment means on the forward end of the flatrack or similar load.

When the load is to be deposited on the ground, the third hydraulic means is initially used to retract the third member rearwardly relative to the second member until the attachment means is located substantially at the forward end of the second member. This movement, of course, moves the load rearwardly on the rollers. The second hydraulic means is then used to rotate the second member about the second pivot point until the second member passes through the vertical position into a position in which it is inclined rearwardly with respect to the vehicle chassis. This movement continues to move the load rearwardly on the rollers and, at the same time, lifts the forward end of the load above the chassis. The first hydraulic means is then used to rotate the first member about the first pivot point. This causes the load to be lifted clear of the rollers with its rear end on the ground. At this stage, the second member is almost vertical with its forward end below said one end. The third hydraulic means are then used to extend to third member with respect to the second member so that the forward end of the load is deposited on the ground.

The sequence of operations in loading a flatrack on to the vehicle is the reverse of the above. The vehicle is positioned a short distance in front of the forward end of the flatrack, and the various members are moved into the final position described in the preceding paragraph. The attachment means on the end of the third member are engaged in the cooperating attachment means on the forward end of the flatrack, and the third member is retracted with respect to the second member, thus lifting the forward end of the flatrack off the ground. The first hydraulic means are then used to rotate the first member about the first pivot axis to a position in which the first member is substantially horizontal. At this stage, the second member will be inclined rearwardly, and the forward end of the flatrack will be raised above the vehicle. The second hydraulic means are then used to rotate the second member together with the third member about the second pivot point, and this action will cause the flatrack to slide along the rollers until it reaches a horizontal position. Finally, the third member will be extended forwardly until the flatrack reaches the transport position.

Preferably locking means are provided on the vehicle chassis and on the flatrack, these locking means being designed to engage when the third member is extended forwardly to slide the flatrack into the transport position. Preferably the locking arrangment is of the kind described in United Kingdom Patent Specification No. 2 112 358.

When the mechanism is designed to tip the load as well as hoist it on and off the vehicle, the first pivot point is preferably movable with respect to the vehicle chassis from a first position in which the mechanism is used for hoisting the load on and off the vehicle, to a second position in which the mechanism is used for tipping the load. The second position of the first pivot point is located rearwardly of the first position.

When the mechanism is used for tipping, the first hydraulic means would be used to rotate the first member about the first pivot point with the third member still extended from the second member as in the transport position.

In a refinement of the tipping system, the rollers and the locks would be mounted on a framework which would automatically rotate about a fourth pivot point when the first hydraulic means is operated with the third member extended forwardly with respect to the second member.

It is to be understood that, in most cases, at least some of the members and means constituting the lifting and tipping mechanism will be duplicated. Thus, for example, there may be a first member on each side of the chassis, each controlled by its own hydraulic ram. The ends of the two first members remote from the first pivot points may be joined by a cross-shaft which constitutes the second pivot point. In this arrangement, there may then be only a single second member located on the lonitudinal axis of the vehicle and pivotally mounted on the cross-shaft. Again there may be only a single hydraulic ram controlling the second member. With this arrangement, there may also be only a single third member telescopically arranged to slide within the second member, and the third hydraulic means may be a ram located within the second member. In a somewhat similar arrangement, the first member may be in the form of a frame controlled by a single hydraulic ram. In particular, this may be a generally A-shaped frame with the second pivot point at the apex of the "A".

Preferably the first attachment means on the third member is in the form of a pair of transverse bars, and the second attachment means on the flatrack comprises a pair of specially shaped slots. The arrangement is such that, when the flatrack is on the ground, the outermost bar on the third member engages in the outer slot on the flatrack. As the flatrack is hosited on to the vehicle, engagement is transferred to the inner bar on the third member and the inner slot on the flatrack.

From another aspect the invention consists in any features of novelty, taken singly or in combination, of the embodiment of the invention illustrated in the accompanying drawings, in which:

FIG. 1 is a side view of a part of a vehicle in accordance with the invention showing a flatrack on the ground, and the hoisting mechanism in the position ready to lift the flatrack on to the vehicle.

FIG. 2 is a scrap view on an enlarged scale showing the engagement between the attachment means on the third member and the flatrack when these integers are in the relative positions shown in FIG. 1.

FIG. 3 is a side view of the part of the vehicle shown in FIG. 1 with the flatrack partially lifted on to the vehicle.

FIG. 4 is a scrap view on an enlarged scale showing the engagement between the attachment means on the third member and the flatrack when these integers are in the relative positions shown in FIG. 3.

FIG. 5 is a side view of the part of the vehicle shown in FIG. 3 with the flatrack further lifted on to the vehicle.

FIG. 6 is a scrap view on an enlarged scale showing the engagement between the attachment means on the third member and the flatrack when these integers are in the relative positions shown in FIG. 5.

FIG. 7 is a side view of the part of the vehicle shown in FIGS. 1, 3 and 5 with the flatrack in the transport position on the vehicle.

FIG. 8 is a side view of the part of the vehicle illustrated in FIGS. 1, 3, 5 and 7 with the flatrack in the tipping position.

FIG. 9 is a scrap view on an enlarged scale showing the engagement between the attachment means on the third member and the flatrack when these integers are in the relative positions shown in FIG. 8.

FIG. 10 is a scrap view on an enlarged scale showing the transfer of the first pivot point from the hoisting to the tipping position.

The vehicle illustrated in the drawings includes a chassis 1, and pairs of rear wheels 2 and 3. The mechanism with which the invention is concerned includes a first member 4 pivotally mounted at 5 on a bracket 6 which is itself pivotally mounted on the vehicle chassis at 7. Also mounted on the bracket 6 are rollers 8 carried on an axle 9 which, in the position shown in FIG. 1, is located in the forwardmost position in a slot 10 in the vehicle chassis. The angular position of the member 4 about the pivot point 5 is controlled by a hydraulic ram 11 which extends between a pivot point 12 on the vehicle chassis and a pivot point 13 located approximately midway along the length of the member 4. As previously explained, the member 4 may be in the form of a framework either having converging arms so that it constitutes an A-frame, or having generally parallel arms so that it constitutes an H-frame.

A second member 14 is pivotally mounted on the end of the member 4 remote from the pivot point 5. The pivotal connection between the members 4 and 14 is located at 15 which is in the vicinity of one end of the member 14. The angular position of the member 14 about the pivot axis 15 is controlled by a hydraulic ram 16 which extends between the pivot point 5 and a pivot point 17 located at said one end of the member 14.

Telescopically mounted within the member 14 is a third member 18. The extension and retraction of the member 18 with respect to the member 14 is controlled by a third hydraulic ram which is not visible in the drawings.

The remote end of the member 18 is curved as shown at 19, and the curved end is provided with two transverse bars 20 and 21. These bars are designed to engage in two slots 22 and 23 provided at the forward end of a pallet or flatrack 24. As can be seen more particularly in FIG. 2, when the mechanism is in the position illustrated in FIG. 1, the bar 21 is engaged in the slot 22.

When the flatrack 24 is to be hoisted on to the vehicle, the member 18 is initially retracted into the member 14 by the third hydraulic ram so that the flatrack is moved into the position illustrated in broken lines at 25. The hydraulic ram 11 is then used to rotate the member 4 anticlockwise as seen in FIG. 1 into the position in which it is shown in FIG. 3. It will be seen from FIG. 3 that the movement of the member 4 also causes the member 14 to swing in an arc. The engagement of the bar 21 in the slot 22 in the flatrack 24 causes the forward end of the flatrack to be raised into the position shown in FIG. 3. The relative positions of the member 18 and the flatrack 24 at this stage are shown in greater detail in FIG. 4.

Loading of the flatrack is continued by operation of the hydraulic ram 16. This action causes anticlockwise rotation of the member 14, together with the member 18, about the pivot point 15. As can be seen from FIG. 5, the angular movement of the members 14 and 18 causes the flatrack 24 to be moved forwardly with respect to the vehicle chassis until the flatrack engages the rollers 8. As can be seen from FIG. 6, at this stage the transverse bar 21 is still engaged in the slot 22, while the bar 20 now enters the slot 23.

Loading of the flatrack is completed by continuing the rotation of the arms 14 and 18 about the pivot axis 15 until they are substantially horizontal as shown in FIG. 7. The third hydraulic ram is then operated to extend the member 18 forwardly out of the member 14. This action moves the flatrack forwardly on the chassis into the transport position. As the flatrack reaches its final position, transverse members 26 on the flatrack engage under hooks 27 secured to the brackets 6. At this stage, the transverse bar 20 on the member 18 is still engaged in the slot 23, but the bar 21 is now disengaged from the slot 22. As can be seen, the shape of the slot 23 is such that the bar 20 serves to prevent upward movement of the forward end of the flatrack with respect to the chassis. Similarly engagement between the transverse members 26 with the hooks 27 prevents upward movement of the rear end of the flatrack.

When the flatrack is to be unloaded, the sequence of events is reversed. In other words, the member 18 is initially retracted into the member 14 causing the transverse members 26 to disengage from the hooks 27. The hydraulic ram 16 is then extended to rotate the members 14 and 18 in a clockwise direction. This moves the flatrack rearwardly on the rollers 8 until the position illustrated in FIG. 5 is reached. Continuing rotation of the members 14 and 18 raises the flatrack from the rollers into the position illustrated in FIG. 3. Thereafter the hydraulic ram 11 is extended rotating the member 4 in a clockwise direction. This action moves the parts into the position illustrated in FIG. 1 with the flatrack in the position illustrated in broken lines at 25. Finally the third hydraulic ram is extended to lower the flatrack to the ground.

When the apparatus is to be used for tipping a body located on the vehicle, the ram 11 is extended with the third ram still in its extended position and the ram 16 still in its retracted position. Thus the body remains attached to the apparatus by engagement of the transverse bar 20 in the slot 23, and engagement of the transverse members 26 with the hooks 27. Since the body and the members 18, 14 and 4 all move as a unit, extension of the ram 11 causes rotation of the brackets 6 about their pivot axis 7. Thus, under these conditions, the body is still located also on the rollers 8. The engagement between the bar 20 and the slot 23 is illustrated to a larger scale in FIG. 9, and the rotation of the brackets 6 about their pivot axis 7 is illustrated on a larger scale in FIG. 10. This Figure shows particularly how the body is maintained in fixed relation with respect to the brackets 6 by engagement with the rollers 8, and by the locking effect achieved between the members 26 and the hooks 27.

The body can, of course, readily be returned from the tipping position shown in FIG. 8 to the transport position shown in FIG. 7 by retraction of the ram 11.

It is to be understood that the apparatus illustrated can be used to lift a flatrack without an upstanding frame at its forward end from a dock, from a trailer or from the ground. Furthermore, it can be used to stack a number of empty flatracks one above the other.

If the apparatus is not required for tipping purposes, the brackets 6 can be omitted and, in this case, the pivot points 5, the rollers 8 and the hooks 27 are located directly on the vehicle chassis.

I claim:

1. A vehicle having a chassis supporting a loadbed at the rear of the chassis, a first longitudinally extending linear member pivotally mounted at one of its ends to pivot about a transverse axis adjacent the rear end of the chassis from a first position in which the first member underlies the loadbed to a second position in which the first member is inclined upwardly and rearwardly relative to the loadbed, a second linear member mounted adjacent one of its ends to the other end of the first member for pivotal movement from a first position wherein the first and second members are in line to a second position in which the second member makes an acute angle with the first member, a third linear member paraxially mounted to the second member so as to be axially slidable relative thereto between an extended and a retracted position, attachment means on the end of the third member distant from the second member, said attachment means detachably engagable with complementary means at a forward, underside portion of a flat rack means, first hydraulic means acting between the chassis and the first member to control the angular position of the first member about the first pivot axis, second hydraulic means acting between the first and second members to control the angular position of the second member relative to the first member, and third hydraulic means acting between the second and third members to control the extension and retraction of the third member relative to the second, the lengths of the members being such that when the first and second members are in their second positions and the third member is extended, the attachment means is positioned substantially at ground level to the rear of the vehicle chassis, and when the first and second members are in their first positions and the third member is extended, the attachment means is positioned substantially in the plane of the loadbed at the forward end thereof.

2. A vehicle as claimed in claim 1, wherein the third longitudinally extending member is telescopically mounted within the second member.

3. A vehicle as claimed in claim 1 wherein the attachment means on the end of the third member comprises a pair of transverse bars adapted to engage in a pair of slots of said complementary means.

4. A vehicle as claimed in claim 1, including rollers in the vicinity of the rear of the vehicle chassis.

5. A vehicle as claimed in claim 1, including locking means for securing a load to the chassis, said locking means being engageable by relative movement between the third and second longitudinally extending members.

6. A vehicle as claimed in claim 1, adapted to tip a load as well as hoist it on and off the vehicle, wherein the first pivot point is movable with respect to the vehicle chassis from a first position in which the mechanism is used for hoisting the load on and off the vehicle, to a second position in which the mechanism is used for tipping the load, said second position of the first pivot point being located rearwardly of the first position.

7. A vehicle as claimed in claim 6, wherein rollers and locks are mounted on a framework in which the first pivot point is located, said framework being adapted to rotate about a fourth pivot point when the first hydraulic means is operated with the third member extended forwardly with respect to the second member.

* * * * *